May 9, 1961 L. C. TWYFORD, JR 2,983,054
DRUM RATER

Filed Feb. 27, 1958 2 Sheets-Sheet 1

INVENTOR.
LORAN C. TWYFORD, Jr.
BY
Lawrence S. Epstein
ATTORNEYS

May 9, 1961

L. C. TWYFORD, JR 2,983,054

DRUM RATER

Filed Feb. 27, 1958

INVENTOR.
LORAN C. TWYFORD, Jr.
BY
Lawrence S. Epstein
ATTORNEYS

United States Patent Office 2,983,054
Patented May 9, 1961

2,983,054

DRUM RATER

Loran C. Twyford, Jr., 2630 Blake Ave.,
Lansing 12, Mich.

Filed Feb. 27, 1958, Ser. No. 718,099

5 Claims. (Cl. 35—9)

(Granted under Title 35, U.S. Code (1952), sec. 266)

The invention described herein may be manufactured and used by or for the Government of the United States of America for governmental purposes without the payment of any royalties thereon or therefor.

This invention relates generally to training devices for testing and more particularly to game-like testers for self-quizzing wherein multiple choice type questions are presented in a manner which encourages an operator to quiz himself.

In the training device art various devices are available which will enable an operator to quiz himself. These prior art devices usually require external power supplies, complex electrical wiring and complex mechanical construction. Often times cumbersome photographic equipment or tape recording equipment is also necessary to present questions to be answered. In addition to the obvious disadvantage of complex construction, these prior art devices are difficult to service and repair and are very expensive. The instant invention overcomes these disadvantages and is of such a nature as to induce self-quizzing because of its game-like nature and because it enables the operator to score himself at once.

A principal object of the invention is to provide a training device for testing the knowledge of the operator.

Another object is to provide a testing device which induces self-quizzing, the operator being able to answer quiz questions appearing sequentially into view and obtaining his score at the same time.

Another object is to provide a mechanically simple and inexpensive tester, of rugged construction and capable of continued use with a minimum of maintenance.

Still another object is to reveal a novel method of quizzing.

Yet another object is to provide a tester which will score and present new questions to the operator.

Yet another object is to provide a tester which will present a new question only when a correct answer is scored.

Still another object is to provide a novel question presenting device.

Other objects and many of the attendant advantages of this invention will be readily appreciated as the same becomes better understood by reference to the following detailed description when considered in connection with the accompanying drawings wherein:

Fig. 3 is an illustrative cutaway view of the tester with some elements omitted for clarity.

Figure 1:
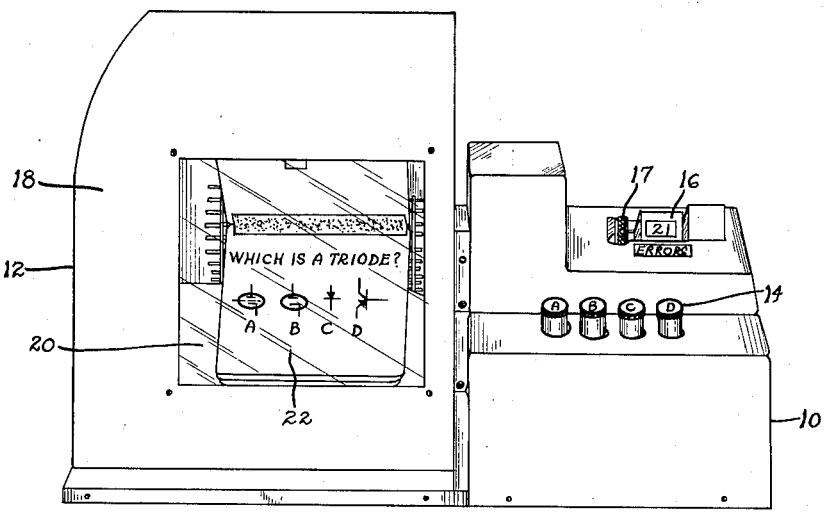
Fig. 1 is a front elevation of a preferred embodiment of the tester.
Figure 2:
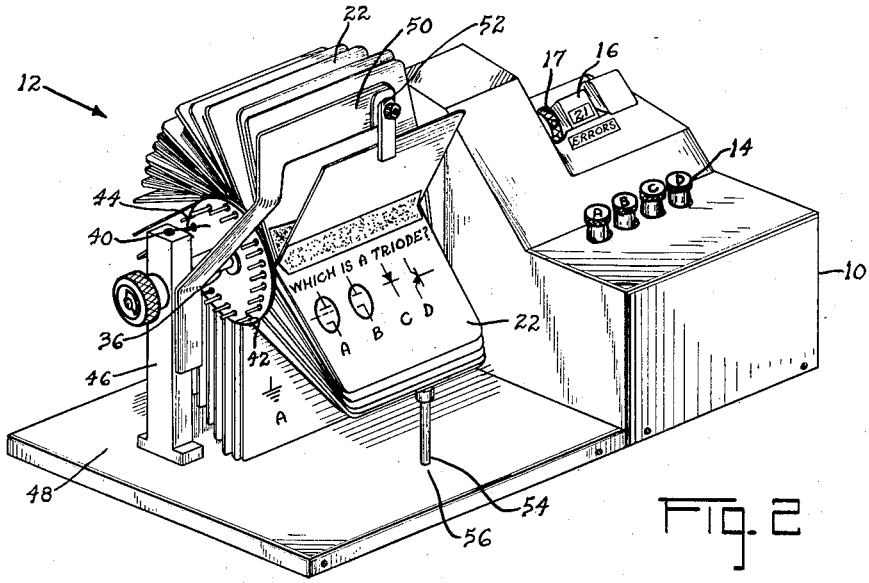
Fig. 2 is a perspective view of the tester with the question presenter cover removed.
Figure 2:
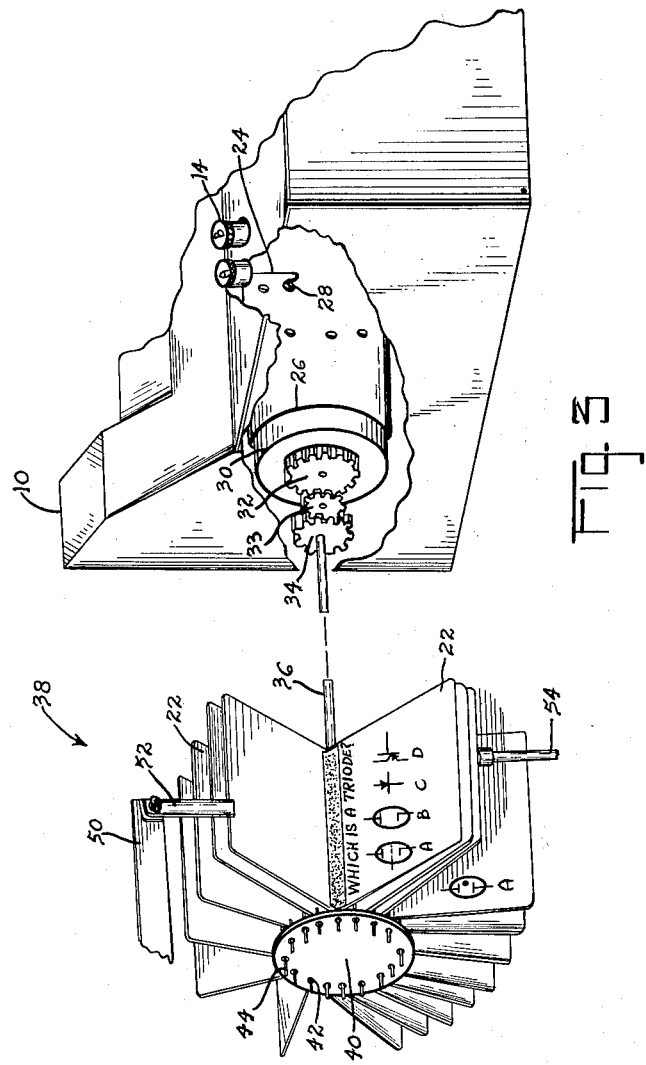

Referring to the figures, a scorer 10 is shown connected to and operable with a question presenter 12. Scorer 10 which will be described more completely later is provided with a plurality of conveniently located answer buttons 14 and a counter 16. The answer buttons 14, when pushed, operate to present a new question card 22 to the operator. Question presenter 12 is provided with a cover 18 in which there is cut a window 20. Question cards 22 are contained within the question presenter 12 in a novel arrangement wherein only one question card is viewable at a time. This novel arrangement will be described in detail subsequently.

Scorer 10 in the preferred embodiment tallies errors made by the operator and operates to present a new question only when a correct answer is made. Located on the top of the scorer 10 are answer buttons 14 corresponding to the choices available on the question card 22 and a counter 16. A wheel 17 is also provided on the top of the scorer to return the counter 16 to its zero or start position. Referring to Figure 3, a hook 24 is fixedly attached to the button 14. Rotatably contained within the scorer 10 is a barrel 30. Fixedly and concentrically retained on the barrel 30 is a cylinder 26. Cylinder 26 has cryptically arranged holes 28 cut therein. The cryptic arrangement of holes corresponds with the order of the correct answers to the questions sequentially presented in the question presenter 12. That is, when the question on question card 22 is answered, only the hook 24 attached to the "A" answer button 14 will be in a position to engage a hole 28; should the operator incorrectly push the "B," "C" and "D" buttons, the hooks 24 attached to these buttons will be unable to engage the holes 28. When a question is correctly answered, the hook 24 is inserted in the hole 28 by the downward push on the answer button 14. As the button is pushed still farther downward, the cylinder 26 and barrel 30 are made to rotate an incremental amount by the tangentially applied force of the hook 24 in the circumferential hole 28. Thus, only correctly answered questions cause the barrel 30 to rotate. When an incorrect answer is made, i.e. barrel 30 does not rotate. Counter 16, which is linked to the barrel 30 by a clutching mechanism (not shown), records the error. Other buttons can then be depressed, each recording errors until the correct one is actuated. No error is recorded, but the next card is brought into position by rotation of barrel 30.

Where it is expeditious to record the correct answers or both correct and incorrect answers, the clutching mechanism may be simply modified to produce the results desired.

The question card presenter 12 is linked to the scorer 10 by means of shaft 36 which is driven by the gear 34. Question presenter 12 contains therein the card rotator 38 which is connected to the shaft 36 and is driven thereby. Card rotator 38 comprises two discs 40 fixedly mounted on shaft 36 at a distance apart at least equal to the width of the question cards 22. Discs 40 are each provided with circumferentially located holes 42 and are positioned on said shaft 36 so as to spacially align each hole 42 on one disc 40 with each hole 42 on the other disc 40. Extending through each pair of aligned holes 42 and rotatably contained therein is a rod 44. A question card 22 is fixed along one of its edges to each rod 44.

The disc and rod arrangement described above is offered as a preferred embodiment and is not intended as a limitation of the invention; other forms may, if expedient, be employed. One such form would be a cylinder with cards rotatably mounted at their edges on the outer surface of the altitude of the cylinder.

Shaft 36 is rotatably terminated within the support 46. Support 46 is mounted by suitable means to the base plate 48 which serves as the mounting plate for both the scorer 10 and the question presenter 12. Support 46 has mounted thereon an arm 50 which extends to a point in front of and above the outer periphery of the card rotator 38. It is to be noted that the point to which arm 50 extends is not critical in itself and the point as herein described is merely a preferred form of the invention. A blade 52, preferably of thin metallic construction, is adjustably mounted on said arm 50 and serves as a stop for preventing more than one question card from falling into view. A vertically adjustable stop 54 is mounted in the base plate 43 and serves to hold the question card which has fallen into view at a desirable aspect. Stop 54 in its preferred form is a rod screwed into the base plate 48 at a central location 56.

In operation, a student reads the multiple choice type question on the question card 22 which is viewable through the window 20. The student, after determining his choice for the correct answer, pushes down on the answer button 14 corresponding with his choice. If his choice is incorrect the counter, which is usually set to zero at the beginning of a test by the wheel 17, scores the error. If the student's choice is correct, the button 14 which is pushed engages and rotates, by means of hooks 24 and holes 28, the cylinder 26 and barrel 30. The amount of rotation which the cylinder 26 and barrel 30 experience is an incremental amount, said incremental amount being the same for each correct answer. When the cylinder 26 and barrel 30 rotate an incremental amount the card rotator, which is coupled to the cylinder and barrel by means of gears 32 to 34 and by shaft 36, likewise rotates an incremental amount. This incremental rotation of the card rotator is just enough to advance the cards 22 to a position where one, and only one, card 22 will cease to be held up by blade 52 thus enabling it to fall and be viewed through window 20. The operating cycle is then repeated for the next question.

Obviously many modifications and variations of the present invention are possible in the light of the above teachings. It is therefore to be understood that within the scope of the appended claims the invention may be practiced otherwise than as specifically described.

What is claimed is:

1. A testing and scoring device comprising a casing, a barrel member rotatably mounted in said casing, a cylinder fixedly retained on said barrel member, said cylinder containing a plurality of cryptically arranged apertures arranged to correspond with the correct answers to questions sequentially presented, a plurality of answer buttons mounted on said casing and means extending from said answer buttons and positioned adjacent said cylinder, whereby depression of said actuator buttons causes said button extending means to travel along the surface of said cylinder, one of which enters the aperture corresponding to the correct answer and whereby release of said actuator button raises the button extending means to rotate said cylinder and barrel member so that another question is brought into view.

2. A testing and scoring device comprising a casing, a barrel member rotatably mounted in said casing, a cylinder concentrically retained on said barrel member, said cylinder containing a plurality of cryptically arranged apertures arranged to correspond with the correct answers to question cards sequentially presented, a plurality of answer buttons mounted on said casing, said buttons being aligned with said cylinder, hook means extending from said buttons and positioned adjacent said cylinder, whereby depression of said actuator buttons causes said hook means to travel along the surface of said cylinder, one of which enters the aperture corresponding to the correct answer card and whereby release of said actuator button raises the hook means to rotate said cylinder and barrel member so that another question card is brought into view.

3. The combination of claim 2, wherein said apertures are spaced apart erratically along the vertical axis of the cylinder and only one aperture is provided on each line of the cylinder.

4. The combination of claim 2, wherein said hook means extends through said aperture and frictionally engage the barrel, whereby said aperture and barrel provide a shallow opening so that the hook means may quickly release after the barrel is rotated.

5. The combination of claim 2, wherein a shaft member axially mounting said barrel member and extending beyond said casing, a plurality of question cards pivotally mounted on said extended shaft member, a first stop extending above said shaft member and engaging said question cards to prevent them from falling and covering the card being viewed and a second stop located in the downward trajectory of said question cards for holding said card at an inclined position at an optimum viewing angle.

References Cited in the file of this patent

UNITED STATES PATENTS

| | | |
|---|---|---|
| 698,114 | Herlt | Apr. 22, 1902 |
| 1,321,292 | Doyle | Nov. 11, 1919 |
| 1,670,480 | Pressey | May 22, 1928 |
| 1,704,022 | Smith | Mar. 5, 1929 |
| 1,749,226 | Pressey | Mar. 4, 1930 |
| 1,813,442 | Dobrowsky | July 7, 1931 |
| 2,317,107 | Oesch | Apr. 20, 1943 |

FOREIGN PATENTS

| | | |
|---|---|---|
| 396,521 | France | Jan. 29, 1909 |
| 1,102,963 | France | May 18, 1955 |